Nov. 25, 1941.   I. C. McKECHNIE   2,264,000
HEADLIGHT BULB STORAGE RECEPTACLE
Filed Sept. 18, 1939
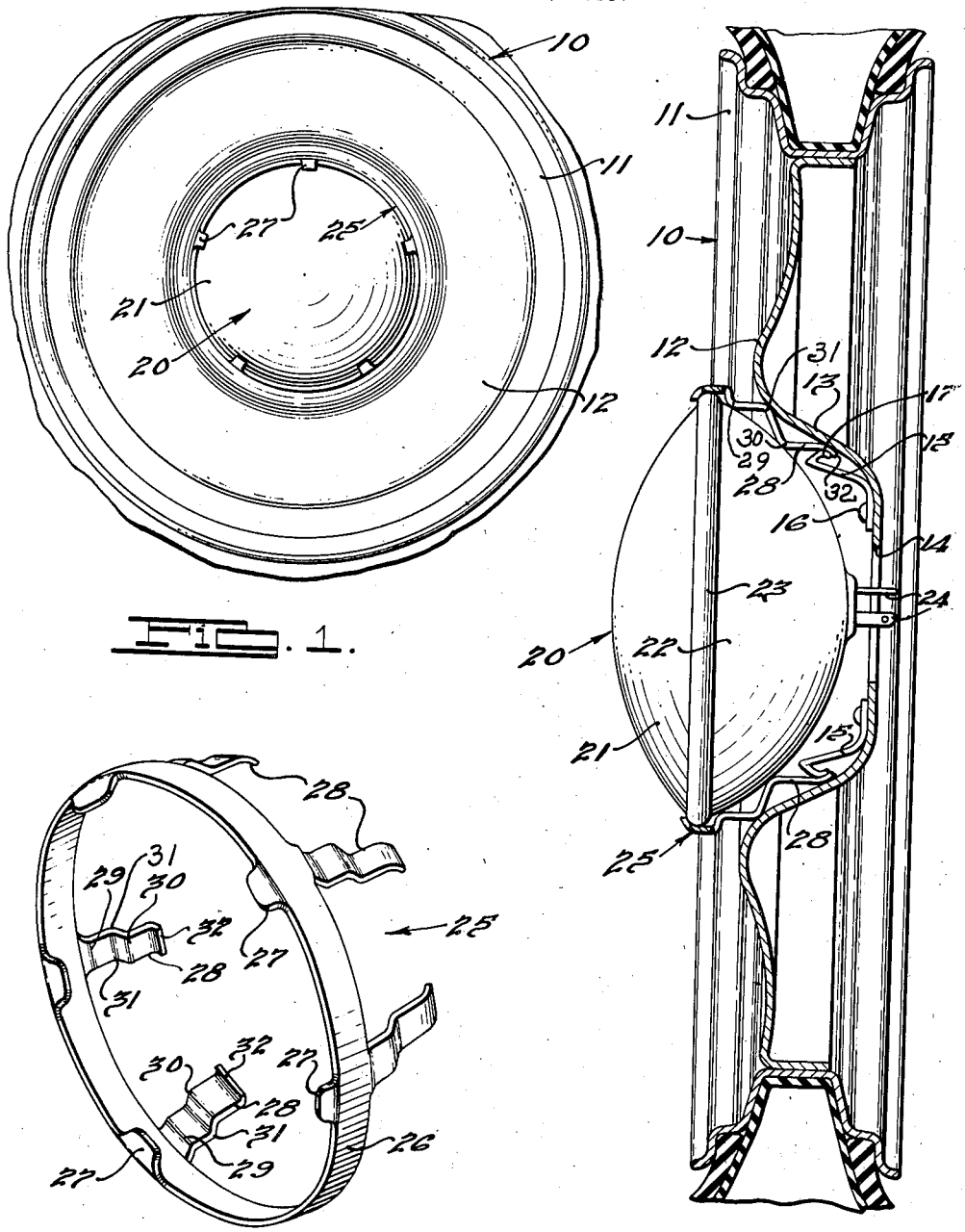
INVENTOR
IAN C. McKECHNIE
BY
ATTORNEYS.

Patented Nov. 25, 1941

2,264,000

UNITED STATES PATENT OFFICE 2,264,000

HEADLIGHT BULB STORAGE RECEPTACLE

Ian C. McKechnie, Highland Park, Mich., assignor to Chrysler Corporation, Highland Park, Mich., a corporation of Delaware Application September 18, 1939, Serial No. 295,410

3 Claims. (Cl. 224—29)

My present invention relates to an accessory device for automotive vehicles, the same comprising means for safely carrying a spare headlight for automotive vehicles provided with headlights of unitary construction, such headlights comprising a glass reflector and lens permanently united to each other and having a filament and contacts permanently associated therewith. In vehicles employing unitary headlights the problem of carrying a spare filament containing element is amplified due to the size of the element and its relatively fragile construction. The unitary headlight is gaining favor for many reasons, including simplicity of manufacture, initial cost, and serviceability, but one drawback to its universal adoption has been the difficulty of carrying a spare headlight, and the amount of space required for such a spare headlight.

The object of the present invention is to provide means for carrying a spare unitary headlight in a safe manner and in a space normally not used for any useful purpose. Such a space is presented by the central portion of the usual spare tire and wheel assembly, whether the spare tire is mounted in an interior trunk compartment or in a fender well or other exterior spare tire mounting means. The present invention provides means whereby the ordinarily present spare tire and wheel assembly is adapted for holding a spare unitary headlight. The present invention also comprises means whereby the unitary headlight is protected against shocks which might fracture the glass thereof or injure the filament, and whereby the outwardly projecting terminals thereof are protected from damage by contact with loose implements or other objects carried in the vehicle.

The objects and advantages of the present invention will be more readily apparent from a study of the following specification and claims taken in connection with the accompanying drawing wherein like numerals refer to like parts throughout.

In the drawing, Fig. 1 is a plan view of a spare wheel assembly having a spare unitary headlight held in position thereon by the present invention;

Fig. 2 is a cross-section taken through a spare tire and wheel assembly having a unitary headlight attached thereto by means of the present invention; and, Fig. 3 is a preferred embodiment of the headlight attaching means manufactured in accordance with the present invention.

In the drawing, the numeral 10 refers to a wheel assembly consisting of a rim 11 and an integral wheel 12, the wheel in most modern automobiles or other automotive vehicles consisting of a stamped piece of sheet metal. The wheel 12 is usually provided with a central, dished portion 13 having a central aperture 14 therethrough, through which the hub of the wheel projects when the wheel is in position. The central aperture 14 is surrounded by a plurality of radially extending spring clips 15 which are fastened to the wheel by inwardly disposed rivets 16 and which are provided with hub-cap flange retaining hooks 17 at their outer extremities. When the wheel is in use, the spring clips are used to maintain an ornamental hub-cap in position to cover the central portion of the wheel and the protruding hub of the axle. The dished central portion 13 is normally of sufficient diameter and depth to receive a large part of a unitary headlight 20 which may be mounted therein when the wheel is not in use, the dished portion thus providing a space within which to carry a spare headlight.

A unitary headlight normally comprises a lens 21 and a reflector 22, the two parts being made of glass joined together at their meeting edges, the line of junction forming a flange 23 at the largest diameter of the headlight; and the headlight is usually provided with terminal bars or fingers 24 projecting rearwardly therefrom. In order to mount the spare headlight in the spare wheel, I provide a headlight mounting member 25 comprising a band or ring 26 of sufficient diameter snugly to embrace the flange 23 of the headlight. The outer edge of the ring 26 is provided with a plurality of overhanging projections 27 which are fairly short but long enough so that the extremities thereof define a circle of lesser diameter than the diameter of the flange 23. The opposite edge of the ring 26 is provided with a plurality of spring clip engaging means 28, each of which is long enough to engage beneath the hook 17 of a spring clip 15 when the spare headlight is in position. Each engaging means is preferably reversely bent at least several times so as to form spaced, oppositely directed engaging points, a plurality of which, as at 29 and 30, engage the surface of the reflector 22, and at least one of which, as at 31, engages the inner portion of the dished portion 13 whereby the unitary headlight is resiliently maintained in spaced relation to the dished portion of the wheel. The extremities of the engaging means 28 are provided with slightly hooked portions 32 adapted to engage between the hooked portions 17 of the hub-cap retainers 15 and the surface of the dished portion 13 of the wheel 12 so as to retain the headlight in position. The relative length of the engaging means 28 is preferably such as to support the headlight with its terminals 24 projecting slightly through the opening 14 in the wheel, with the ends of the terminals maintained inside of the plane of the edge of the wheel rim 11 so as to protect the terminals from damage.

In order to use the device the engaging means 28 are spread apart so that the headlight may be passed between them until its lens portion engages the headlight retaining points 27 and the ring 26 surrounds the flange 23 of the headlight. Thereafter the headlight with the mounting ring thereon is placed in the dished portion of the spare wheel and the hooked portions 32 of the retaining means engaged beneath the hooked portions 17 of the hub-cap clips 15, preferably by aligning the two sets of members and forcing inwardly upon the flange of the headlight and the ring 26. The spare wheel with the headlight associated therewith may now be placed in the usual spare wheel carrier, and the headlight associated therewith will be protected thereby.

Having illustrated and described a preferred embodiment of my invention, it should be apparent to those skilled in the art that the same permits of modifications in arrangement and details. All such modifications as come within the scope of the following claims are considered a part of my invention.

I claim:

1. Means for mounting a spare unitary headlight in the dished central portion of a spare wheel of an automotive vehicle in order to protect said spare headlight from damage, comprising a ring adapted to encircle the widest part of said headlight, said ring being provided with a plurality of spaced projections, certain of said projections extending in one direction from said ring in order to engage the front surface of said spare headlight and others of said projections extending rearwardly in order to engage the rear surface of said spare headlight whereby the two sets of projections maintain said ring in position about the headlight, and the projections at one side of said ring being elongated and provided with means to engage a portion of the wheel.

2. Means for mounting a spare unitary headlight in the dished central portion of a spare wheel of an automotive vehicle in order to protect said spare headlight from damage, comprising a ring adapted to encircle the widest part of said headlight, said ring being provided with a plurality of spaced projections, certain of said projections extending in one direction from said ring in order to engage the front surface of said spare headlight and others of said projections extending rearwardly in order to engage the rear surface of said spare headlight whereby the two sets of projections maintain said ring in position about the headlight, and the projections at one side of said ring being elongated and reversely bent several times, the ends thereof being provided with means to engage a portion of the wheel in order to maintain the headlight in position and the reversely bent portions thereof providing means to space the surface of the spare headlight from the adjacent surface of the wheel.

3. Means for mounting a spare unitary headlight in the dished central portion of a spare wheel of an automotive vehicle having hub-cap clips thereon in order to protect said spare headlight from damage, comprising a ring adapted to encircle the widest part of said headlight, said ring being provided with a plurality of spaced projections, certain of said projections extending in one direction from said ring in order to engage the front surface of said spare headlight and others of said projections extending rearwardly in order to engage the rear surface of said spare headlight whereby the two sets of projections maintain said ring in position about the headlight, and the projections at one side of said ring being elongated and reversely bent several times, the ends thereof being formed to engage said hub-cap clips in order to maintain the headlight in position and the reversely bent portions thereof providing means to space the surface of the spare headlight from the adjacent surface of the wheel.

IAN C. McKECHNIE.